United States Patent [19]
Fontaine

[11] 3,846,599
[45] Nov. 5, 1974

[54] VEHICLE PEDAL OPERATED SWITCH
[75] Inventor: John Garfield Fontaine, Fort Lauderdale, Fla.
[73] Assignee: Fail Safe Brake Corporation, Fort Lauderdale, Fla.
[22] Filed: Oct. 29, 1973
[21] Appl. No.: 410,475

[52] U.S. Cl............ 200/61.89, 200/86.5, 200/161
[51] Int. Cl....................... H01h 3/14, H01h 17/10
[58] Field of Search ....... 200/61.89, 86.5, 161, 154, 200/6 R, 337

[56] References Cited
UNITED STATES PATENTS

| | | | |
|---|---|---|---|
| 1,471,903 | 10/1923 | Lindberg | 200/61.89 X |
| 2,178,343 | 10/1939 | Hebler | 200/61.89 |
| 2,443,441 | 6/1948 | Birge | 200/161 |
| 2,686,851 | 8/1954 | Sanda | 200/154 |
| 2,743,329 | 4/1956 | Vartanian | 200/61.89 |
| 3,155,760 | 11/1964 | Thomas et al. | 200/86.5 X |
| 3,435,165 | 3/1969 | Lombard | 200/61.89 |
| 3,497,871 | 2/1970 | Damico | 200/86.5 |

Primary Examiner—James R. Scott
Attorney, Agent, or Firm—Oltman and Flynn

[57] ABSTRACT

The apparatus includes an arm pivoted between its end portions, a foot pedal for operating one of the end portions of the arm, and a switch operated by the other end portion of the arm. The pedal may be the accelerator pedal of an automotive vehicle. When the pedal is depressed, the switch operates immediately, even before the engine of the vehicle speeds up. The preferred switch has a special construction which is also part of the invention.

11 Claims, 6 Drawing Figures

PATENTED NOV 5 1974

3,846,599

VEHICLE PEDAL OPERATED SWITCH

BACKGROUND OF THE INVENTION

Some equipment for automobiles, trucks and other vehicles requires a switch that is operated when the vehicle is ready to move. For example, the present applicant has invented safety brakes which can automatically stop a vehicle and which can keep a vehicle stopped so that it does not creep when the brake pedal is released. However, the brakes must be released when the driver wants the vehicle to move. A simple way of accomplishing this involves fastening a multi-contact pressure switch on top of the accelerator pedal so that the switch operates when the accelerator pedal is depressed as disclosed in applicant's U.S. Pat. No. 3,763,975 issued Oct. 9, 1973. However, it has been found that (1) it is difficult to install such a switch, (2) the wires of the switch could be disconnected inadvertently by the driver, and (3) a switch of this type detracts from the appearance of the interior of the vehicle. There has been a need for an apparatus including a simple switch for the purpose just described which has universal application in different vehicles, which could be supplied in kit form, which could be easily installed, which would be reliable and not unattractive.

SUMMARY OF THE INVENTION

A pedal assembly is provided with a switch which is operated by an arm coacting with a cable when a foot pedal is depressed. The arm is pivotally mounted. The foot pedal operates one end portion of the arm, and the switch is operated by the other end portion of the arm. In a preferred embodiment, the switch has two contacts. The cable passes through a movable contact of the switch, so that when the pedal is depressed, the cable and the arm operate the movable contact. The movable contact preferably has an open-ended slot in it so that it can easily be inserted between an enlargement on the cable and the arm, thus making it very easy to install the switch. The cable is connected to the throttle linkage of the vehicle in the preferred application of the invention so that when the foot pedal is depressed, the switch activates before the engine speeds up.

Accordingly, it is an object of the invention to provide improved apparatus for switching wherein a switch is operated in response to depression of a foot pedal.

Another object of the invention is to provide an assembly wherein a switch is operated by a foot pedal remote from the switch.

A further object of the invention is to enable a switch to be installed quickly and easily to cooperate with an accelerator pedal of a vehicle so that the switch will be operated in response to depression of the pedal.

Another object of the invention is to provide a switch, universal in nature, that will find placement on most, if not all, modern vehicles whereby a disregard can be had for the shape, size or configuration of the foot pedal itself and that will activate upon depression of the foot pedal prior to the motor speeding up and that will remain activated so long as pressure is exerted on the foot pedal.

Still another object of the invention is to provide an assembly in which a switch, a cable, an arm and a pedal cooperate to operate the switch prior to the engine speeding up in response to pressure on the pedal.

Other objects of this invention will appear from the following description and appended claims, reference being had to the accompanying drawings forming a part of this specification wherein like reference characters designate corresponding parts in the several views.

Before explaining the present invention in detail, it is to be understood that the invention is not limited in its application to the arrangement illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Figure 1:
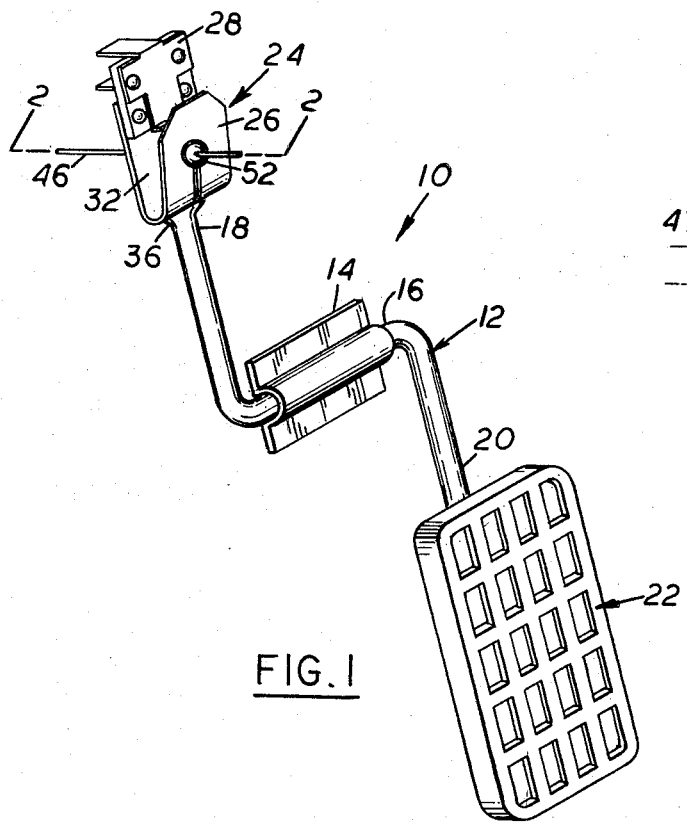
FIG. 1 is a perspective view of a pedal assembly in accordance with one embodiment of the present invention.

The pedal assembly 10 of FIG. 1 includes an arm 12, and means in the form of a bracket 14 for pivotally mounting the arm 12 at a central section 16 which is perpendicular to the arm's upper end portion 18 and lower end portion 20. A foot pedal 22 is connected to or associated with the lower portion 20 of the arm 12 for operating portion 20. The foot pedal 22 is, in the preferred embodiment, the accelerator pedal of an automotive vehicle. A switch 24 is mounted on the upper end portion 18 of the arm 12. When the foot pedal 22 is depressed, the switch 24 is operated by the upper arm portion 18 which moves in the direction opposite to the direction of movement of the pedal 22.

Figure 2:
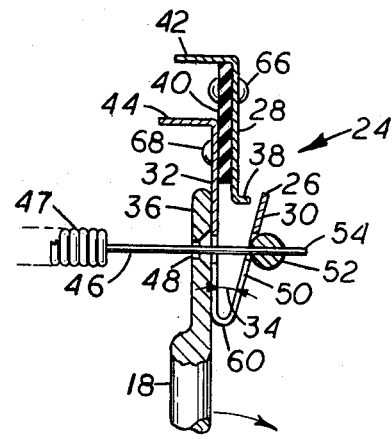
FIG. 2 is a fragmentary sectional view taken along lines 2—2 of FIG. 1 and looking in the direction of the arrows.

Referring to FIG. 2, the switch 24 has a movable contact 26 and a fixed contact 28. The movable contact 26 has two portions 30 and 32 which form an acute angle 34 between the same. The rear wall portion 32 of contact 26 lies against a flattened end 36 of the upper portion 18 of arm 12. Fixed contact 28 is positioned between the two portions 32 and 30 of movable contact 26 where its tip 38 can be engaged by contact portion 30. Insulation means 40 is located between rear wall portion 32 and fixed contact 28. Fixed contact 28 and rear wall portion 32 have flanges 42 and 44 to which electrical connections may be made so that a circuit will be completed when contact portion 30 engages fixed contact tip 38.

The inner wire 46 of a cable 47 is connected to the movable contact 26. The wire 46 of the cable is connected at its other end to the throttle mechanism of the automotive vehicle. The wire 46 extends through an opening 48 in the flattened end 36 of arm portion 18 and also extends through an open ended slot 50 in both the rear wall portion 32 and the contact portion 30 of the switch contact 26. The wire 46 of the cable 47 has an enlargement 52 at its end 54. Contact portion 30 has an opening 58 which is slightly larger than the slot 50. (See FIGS. 3 and 5.) In the assembly of FIG. 2, the enlargement 52 is received in the opening 58 and engages the contact portion 30 of movable contact 26.

When the pedal 22 is depressed, the upper arm portion 18 moves to the right as viewed in FIG. 2. The lower end 60 of contact 26 bends relatively easily, so that as the upper arm portion 18 moves to the right, enlargement 52 forces contact arm 30 against tip 38. The terms "movable" and "fixed" are used in a relative sense since the contact 28 is actually moved by the upper arm portion 18 against the contact portion 30 which initially is held stationary by the enlargement 52.

After the switch has closed, further movement of upper arm portion 18 to the right as viewed in FIG. 2 pushes the enlargement 52 and wire 46 to the right as viewed in FIG. 2 so as to speed up the engine of the vehicle.

Figures 4, 5:
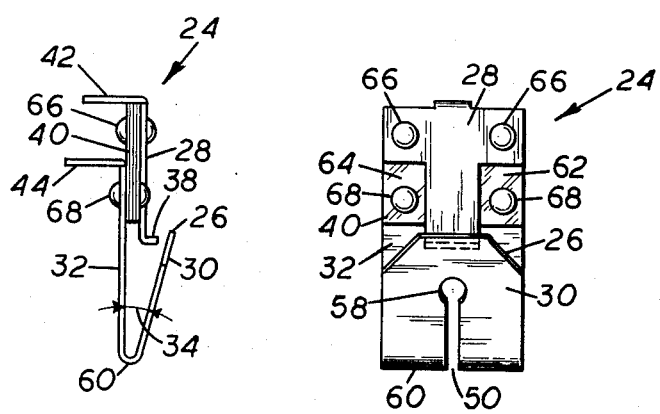
FIG. 4 is a side elevational view of a switch included in the assembly of FIG. 1.
FIG. 5 is a front elevational view of the switch.

FIGS. 4 and 5 further illustrate the construction of the switch 24. The open ended slot 50 can be seen particularly in FIG. 5, and it may be seen that the slot opens at the bottom edge 60 of contact 26. The contact 26 is an angled member which includes the two portions 30 and 32 and the upper flange 44. The other contact 28 has a T-shape (FIG. 5) which leaves portions 62 and 64 of the insulator 40 exposed.

The insulator 40 is secured to the rear wall portion 32 of contact 26 and the back of contact 28. Both contacts 26 and 28 are secured to the insulator 40 by any conventional means. In the illustrated embodiment, the fastening means comprises rivets 66 and 68. A suitable alternative fastening means is cement.

Figure 3:
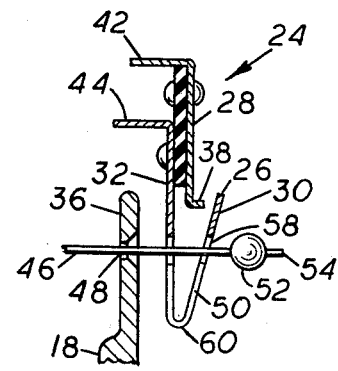
FIG. 3 is an exploded view similar to FIG. 2, but showing parts separated from each other as they would appear when inserting a switch in the pedal assembly.

In order to assemble the switch 24 with the arm 12 and the cable means, the upper arm portion 18 is pushed slightly to the left as shown in FIG. 3. The switch 24 is inserted between the flattened end 36 of the arm portion 18 and the enlargement 52 by letting the wire 46 be received in the slot 50 until the wire is located in the opening 58. The arm portion 18 is then pushed to the right as viewed in FIG. 3 until the enlargement seats in the opening 58 and the contact arm 32 is held against the flattened end 36 of the arm. The wire 46 will be held in this position by the throttle linkage so that the switch is firmly held in place. However, the switch could be further secured to the arm if desired.

Since the switch 24 is small and is located up under the dashboard area of the vehicle remote from the pedal 22, it does not detract from the appearance of the interior of the vehicle. The switch can be installed very quickly in the pedal assembly. One switch of a fixed design can be used with pedal assemblies varying considerably in structural details as long as they are of the general type described herein. Thus, a relatively universal switch has been provided.

Figure 6:
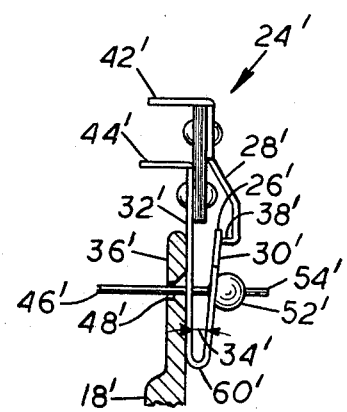
FIG. 6 is a fragmentary sectional view of another embodiment.

FIG. 6 illustrates another embodiment of the switch. The same reference numerals are used for like parts as compared to FIGS. 1–5 except that a prime designation has been added to the numerals in FIG. 6. The only difference in FIG. 6 as compared to FIGS. 1–5 is that the contact 28' bends around to engage the outside of movable contact 26' so that the switch is normally closed and opens when actuated.

I claim:

1. A switch for use in a foot pedal assembly on a motor vehicle which has an arm pivoted between its upper and lower ends, foot pedal on the lower end of said arm, said arm having an opening near its upper end, and a cable extending through said opening in the arm and having an enlargement on its front end in front of said opening in the arm, said switch comprising:
    first and second contact members having confronting engageable contact portions;
    and means attaching said contact members to one another for handling as a unit and insulating said contact members from each other;
    said first contact member having open-ended slot means therein for passing said cable when said first contact member is inserted between the front of said arm and said enlargement on the cable;
    said first contact member being engageable from in front by said enlargement to cause relative movement between said confronting contact portions of the contact members to operate the switch when the foot pedal is depressed.

2. A switch according to claim 1, wherein:
    said first contact member has a back wall portion for engaging the front of said arm adjacent the latter's upper end, and a contact portion connected flexibly and resiliently at one end to said back wall portion and extending at an acute angle to said back wall portion toward the contact portion of the second contact member;
    and said slot means comprises aligned slots in said back wall portion and said contact portion of the first contact member which are open at said one end of the latter.

3. A switch according to claim 1, wherein said confronting contact portions of the contact members are normally spaced apart, and said confronting portions engage one another to close the switch when the foot pedal is depressed.

4. A switch according to claim 1, wherein said confronting contact portions of the contact members normally engage one another, and said confronting portions are separated to open the switch when the foot pedal is depressed.

5. A swtich for use in an accelerator pedal assembly on a motor vehicle which has an arm pivoted between its upper and lower ends, an accelerator foot pedal on the lower end of said arm, said arm having an opening near its upper end, and a throttle cable having an inner wire extending through said opening in the arm and having an enlargement on its front end in front of said opening in the arm, said switch comprising:
    a first contact member having a back wall portion for engaging the front of said arm at its upper end and contact portion connected flexibly and resiliently at its lower end to the lower end of said back wall portion and extending up spaced in front of said back wall portion, said back wall portion and said contact portion having aligned, upwardly extending slots therein which are open at their lower ends to pass said cable and to position said enlargement on the inner wire of the cable in front of said contact portion when the first contact member is inserted down between the upper end of said arm and said enlargement;
    and a second contact member attached to and insulated from the first contact member and positioned in confronting relationship to the upper end of said contact portion of the first contact member for operation of the switch when the accelator pedal is depressed.

6. A switch according to claim 5, wherein said second contact member normally is spaced from said contact portion of the first contact member, and said second contact member and said contact portion of the first contact member engage each other to close the switch when the foot pedal is depressed.

7. A switch according to claim 5, wherein said second contact member normally engages said contact portion of the first contact member, and said second contact member and said contact portion of the first contact member separate to open the switch when the foot pedal is depressed.

8. A switch according to claim 5, wherein said contact portion of the first contact member normally extends upward at an acute angle away from said back wall portion and terminates in a free upper end.

9. A switch according to claim 8, wherein said slot in said contact portion of the first contact member has an enlarged upper end for seating said enlargement on the inner wire of the cable.

10. A switch according to claim 5, and further comprising insulation means sandwiched between the second contact member and the upper end of said back wall portion of the first contact member.

11. A switch according to claim 10, wherein said second contact member has a tip at its lower end projecting toward said contact portion of the first contact member adjacent the latter's upper end.

* * * * *